United States Patent [19]

Suzuki et al.

[11] 4,030,685

[45] June 21, 1977

[54] MAGNETIC TAPE MAGAZINE

[75] Inventors: Osamu Suzuki; Goro Akashi; Akira Kasuga; Kenji Sega, all of Odawara, Japan

[73] Assignee: Fuji Photo Film Co., Ltd., Minami-ashigara, Japan

[22] Filed: Aug. 15, 1975

[21] Appl. No.: 605,046

[30] Foreign Application Priority Data

Aug. 16, 1974 Japan .............................. 49-94046

[52] U.S. Cl. .............................. 242/199; 242/75.41
[51] Int. Cl.² ......................................... G11B 23/10
[58] Field of Search .......... 242/199, 200, 198, 197, 242/192, 210, 204, 71.2, 75.41, 75.42, 54.1, 75, 75.1, 156, 156.1; 360/96

[56] References Cited

UNITED STATES PATENTS

| | | | |
|---|---|---|---|
| 2,063,285 | 12/1936 | Wittel | 242/199 |
| 3,125,311 | 3/1964 | Willis | 242/192 |
| 3,297,268 | 1/1967 | Sawazaki | 242/192 |
| 3,426,977 | 2/1969 | Siegemund | 242/199 |
| 3,722,829 | 3/1973 | Arnoldussen | 242/210 |

*Primary Examiner*—George F. Mautz
*Attorney, Agent, or Firm*—Gerald J. Ferguson, Jr.; Joseph J. Baker

[57] ABSTRACT

An elastic flexible belt is tensioned around feed-out and take-up tape convolutions in a magnetic tape magazine to press the convolutions inward and tightly wind the tape on cores. By the tension of the flexible belt provided around the tape convolutions, the tape is tightly wound on the cores and stably fed in the magazine, and accordingly, the edges of the tape are effectively aligned in the convolutions.

6 Claims, 4 Drawing Figures

MAGNETIC TAPE MAGAZINE

BACKGROUND OF THE INVENTION

1. Field of the Invention

This invention relates to a magnetic tape magazine, and more particularly to a magnetic tape magazine in which a tape feed-out core and a tape take-up core are rotatably mounted and a magnetic tape is wound thereon with a part thereof exposed at a front aperture of the magazine.

2. Description of the Prior Art

Magnetic tape magazines or cassettes have been recently made considerably compact in size and the magnetic tape has been improved to have higher density so that a magnetic tape in a single tape magazine can record a great amount of information. In order to increase the capacity of recording of the magnetic tape (hereinafter referred to simply as "tape"), the thickness thereof has been markedly reduced and the surface thereof is mirror-finished.

Such a thin and highly finished tape is apt to be jammed in the tape magazine. Further, the edge of the tape is apt to be disaligned in the convolutions within the magazine particularly when the tape is repeatedly fed and wound back quickly in the recording or playing process. The unstable winding of the tape within the tape magazine causes the tape to be distorted or even stopped in a tape recorder.

In the conventional tape magazine, there are provided a pair of friction sheets on the internal surface of the pair of magazine halves so that the both edges of the tape wound on the cores in the magazine may be aligned and imparted with proper frictional resistance thereby. However it has been difficult to completely align the edges of the tape in the convolutions only by the friction sheets. Further, the friction sheets are disadvantageous in that the tension of the tape is increased to a great extent when an edge of the tape is projected out of the tape convolution. Further, the projected edge of the tape is liable to be permanently deformed and causes errors in the reproduction process.

SUMMARY OF THE INVENTION

In view of the above described defects inherent in the conventional tape magazine, the primary object of the present invention is to provide a magnetic tape magazine in which the edge of the tape is accurately aligned under any conditions.

Another object of the present invention is to provide a magnetic tape magazine in which is the tape is stably fed with a constant tension.

Still another object of the present invention is to provide a magnetic tape magazine in which a tension controlling means provided in the magazine body also serves as a tape cleaner.

Other objects will be made apparent from the detailed description of the invention made hereinafter with reference to the accompanying drawings.

The above objects are accomplished by simply providing an elastic flexible belt in the tape magazine in order to press the tape convolutions inward. The flexible belt is tensioned around the tape convolutions on the tape feed-out core and the tape take-up core.

The flexible belt is urged to press the convolutions inward to tighten the winding of the tape and prevent air from entering between the adjacent tape convolutions when the tape is wound up in a convolution. Further, since the flexible belt is urged on the convolutions of the tape in the magazine in contact with the outermost tape convolution thereof, the tension of the tape is made constant and the tape can be stably fed without vibration in the direction of the axis of rotation of the core.

DESCRIPTION OF THE PREFERRED EMBODIMENTS

Figure 1:
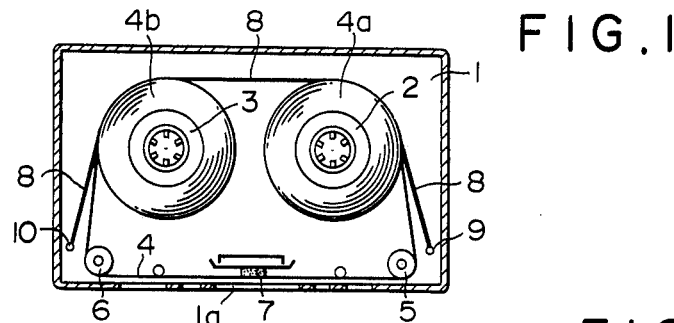
FIG. 1 is a plan view of the magnetic tape magazine in accordance with an embodiment of the present invention with the cover removed.

A preferred embodiment of the present invention is shown in FIG. 1 wherein a tape magazine is illustrated with the cover removed. Referring to FIG. 1, a tape feed-out core 2 and a tape take-up core 3 are rotatably mounted in a magazine casing 1 in parallel to and spaced apart from each other. As is well known in the art, a magnetic tape 4 is wound on cores 2 and 3 and tensioned around rotatable guide rollers 5 and 6 mounted in the casing 1 by way of a tape pressure pad 7 softly urged on the tape 4 from backside at a front aperture 1a of the magazine casing 1. In this first embodiment of the present invention, an elastic resilient flexible belt 8 is tensioned around the convolutions 4a and 4b of the tape wound around the feed-out core 2 and the take-up core 3, respectively. One end of the flexible belt 8 is engaged with a fixed pin 9 and the other end thereof is engaged with another fixed pin 10 both fixed to the magazine casing 1. The flexible belt 8 is tensioned around the convolutions 4a and 4b by its elasticity.

Since the flexible belt 8 is tensioned on the convolutions 4a and 4b of the tape 4, the convolutions 4a and 4b are pressed inward to tightly wind the tape 4 on the cores 2 and 3. Although the diameter of the convolutions 4a and 4b wound on the cores 2 and 3 changes as the tape 4 is fed from one to the other, the tension of the flexible belt 8 does not change substantially since the total diameter of the two convolutions 4a and 4b of the tape 4 does not change to a great extent. Therefore, the tape 4 can be fed with substantially constant tension and can be wound stably without vibrating in the direction of the axis of rotation of the cores 2 and 3.

The main reason for the stable feed of the tape 4 effected by the provision of the flexible belt 8 is considered to be that air is prevented from entering between the adjacent tape convolutions when the tape 4 is wound up. If the air enters between the outermost convolution and the next outermost convolution of a tape convolution wound on a take-up core (or a feed-out core when rewound), the outermost convolution is liable to slide laterally which results in disalignment of the edges of the tape, Further, since the tape convolutions 4a and 4b are pressed inward by the flexible belt 8 which is urged to press the convolutions 4a and 4b with a constant tension, the tape 4 is imparted with a constant force to tighten the winding thereof.

The flexible belt 8 tensioned around the tape convolutions 4a and 4b should preferably have a friction coefficient of not more than 0.5 with respect to the surface of the magnetic layer of the tape 4 so that the tape 4 may not be exerted with too large a friction force by the belt 8. The width of the flexible belt 8 should preferably be 0.2–0.3mm larger than the width of the tape 4.

As the flexible belt 8 tensioned around the tape convolutions 4a and 4b, can be used the following materials. Non-woven cloth having a thickness not more than 500μ. Long fabric Japanese paper. Urethane rubber belt containing graphite. Teflon belt. Polyester belt having springs or rubber members at the opposite ends thereof. Elastic stainless steel belt having a thickness of 50 to 100μ. Nylon belt.

Among the above materials, the non-woven cloth and Japanese paper are advantageous in that the belt will clean the surface of the tape when the tape travels in slide contact therewith and accordingly will prevent the drop-out of the tape caused by the repeated use thereof. Further, in order to improve the sliding characteristic of the flexible belt with respect to the tape, the belt may be coated, impregnated or plated with graphite, carbon or the like.

When non-elastic material such as polyester film or metal sheet is used as the flexible belt, rubber members or springs are connected with the both ends of the belt. It will be understood that a rubber member or a spring may be connected only with one end of the belt.

Figure 2:
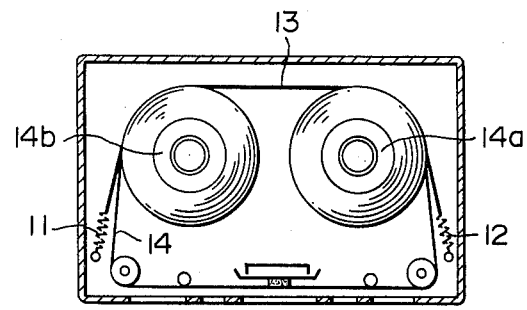
FIG. 2 is a plan view of the magnetic tape magazine in accordance with a second embodiment of the present invention with the cover removed.

A second embodiment of the tape magazine in accordance with the present invention in which tension springs are connected with both ends of a flexible belt is shown in FIG. 2. Referring to FIG. 2, a pair of tension springs 11 and 12 are connected with both ends of a non-elastic flexible belt 13 as of stainless steel or polyester film to make the belt 13 press a pair of convolutions 14a and 14b inward by the tension thereof. Those elements shown in FIG. 2 that are similar to those shown in FIG. 1 are all equivalent thereto, and accordingly, the detailed description thereof is omitted here.

Figure 3:
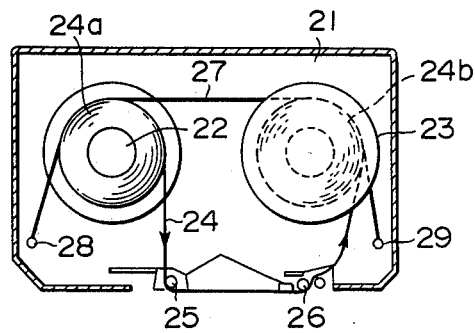
FIG. 3 is a plan view of the magnetic tape magazine in accordance with a third embodiment of the prsent invention with the cover removed.

FIG. 3 illustrates a third embodiment of the present invention embodied in a video tape cassette. Referring to FIG. 3, a tape feed-out core 22 and a tape take-up reel 23 are totatably provided in parallel to each other in a cassette casing 21. A video tape 24 is wound on the feed-out core 22 and guided by guide pins 25 and 26 and then taken up on a take-up reel 23. An elastic flexible belt 27 is tensioned around the tape convolution 24a on the feed-out core 22 and the tape convolution 24b on the take-up reel 23 with the opposite ends thereof engaged with a pair of pins 28 and 29 fixed in the casing 21. The function of the flexible belt 27 is quite the same as that of said flexible belt 8 and 13 described with reference to FIGS. 1 and 2. The material which can be used as the flexible belt 27 is also the same as that employed in said belt 8.

Now the preferred embodiments of the present invention will further be described with reference to several examples thereof.

The data indicated in every example were obtained by measuring systems as follows.

State of Convolution

Figure 4:
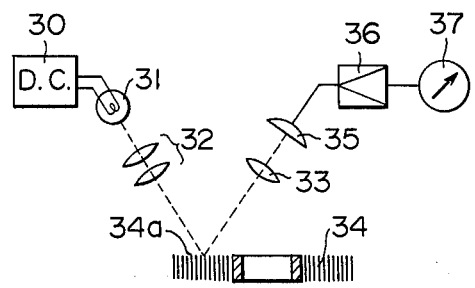
FIG. 4 is a side view schematically showing the device for measuring the state of alignment of the edges of the tape wound on a core in a convolution.

The state of alignment of edges of the tape wound in convolution was measured by use of a surface detecting system as shown in FIG. 4. Referring to FIG. 4, a lamp 31 is connected with a light source power 30 such as a D.C. power source and emits light to illuminate the surface of the edge plane 34a of a tape convolution 34. A condenser lens system 32 is provided between the lamp 31 and the tape convolution 34 to condense the light from the lamp 31 onto the surface of the edge plane 34a of the tape convolution 34. Another condenser lens system 33 is provided above the tape convolution 34 to receive the light reflected by the edge plane 34a of the tape convolution 34 and condense the light onto a phototransistor 35. The phototransistor 35 receives the light condensed through the condenser lens system 33 and converts the light to electricity. A meter 37 is connected with the phototransistor 35 by way of an amplifier 36 to indicate the amount of light received by the phototransistor 35 in terms of percentage which represents the reflectance of the edge plane 34a of the tape convolution 34. The percentage indicative of the reflectance is shown in the table of data in which (a) indicates the reflectance under the condition of PLAY, and (b) indicates the reflectance under the condition of REWIND. The percentage of the reflectance is calibrated with the reflectance of a mirror placed on the edge plane 34a set 100%.

Tension

The tension of the tape was measured with a torque mater model M-400 made by Information Terminal Company.

Phase Shift

A phase shift of a signal of 6.3KHz recorded in a tape recognized between a right channel and a left channel was measured with a phase meter model MPN-553 made by Meguro Dempa Co., Ltd., Japan. As the tape recorder, was used a digital cassette evaluator model CT10 made by Nakamichi Kenkyusho.

Drop-out

As the drop-out, the number of output drops over 50% per minute of a signal of 6.3KHz was measured.

EXAMPLE I

A non-woven belt having a thickness of 150 microns, a width of 4mm and a length of 160mm was provided in a tape magazine in accordance with the first embodiment of the invention as shown in FIG. 1. The magnetic tape used had a base thickness of 5 microns and a magnetic layer thickness of 4 microns, and was of high density type. The length of the tape was 180m. The slide friction coefficient between the tape and the belt was 0.32 and the elasticity of the flexible non-waven belt was 0.2mm/g. The force exerted on the tape convolution inward by the belt was 10g. The results measured were as shown in Table I in comparison with a conventional magazine without the flexible belt.

TABLE I

| Measured Item | This Invention | | Conventional | |
|---|---|---|---|---|
|  | (a) | (b) | (a) | (b) |
| State of Convolution | 72% | 67% | 43% | 34% |
| Initial Back Tension | 10g | | 5–25g | |
| Tension after 50 times play | 14g | | 10–43g | |
| Tape Distortion after 50 times play | Non | | Edge expanded | |
| Phase Shift | under 5° | | 10–15° | |
| Drop-out after 50 times play | 5 | | 30 | |

EXAMPLE II

A polyester base was used as a flexible belt in accordance with the second embodiment of the invention as shown in FIG. 2. The thickness of the belt was 38 microns, the length of the belt was 134mm and coil springs were connected with the ends of the belt. The coil springs had a length of 13mm when released, a diameter of 0.15mm, 25 windings, and a tension of 12.5g/mm. The tape was the same as that used in Example I. The results measured were as shown in Table II.

EXAMPLE III

An urethane rubber belt having a thickness of 120 microns and containing 45% of graphite having a mean grain size of 3 microns was used as the flexible belt in accordance with the second embodiment of the invention as shown in FIG. 2. The length of the belt was 156mm and the tension thereof was 9g/mm. The friction coefficient between the urethane belt and the tape was 0.31. The tape was the same as that used in Example I. The results measured were as shown in Table II.

TABLE II

| Measured Item | Example II | | Example III | |
| --- | --- | --- | --- | --- |
| | (a) | (b) | (a) | (b) |
| State of Convolution | 70% | 65% | 71% | 63% |
| Initial Back Tension | 16g | | 8g | |
| Tension after 50 times play | 22g | | 10g | |
| Tape Distortion after 50 times play | Non | | Non | |
| Phase Shift | under 5° | | under 6° | |
| Drop-out after 50 times play | 13 | | 12 | |

Reviewing the results shown in Tables I and II, it is noted that the measured values for Examples I, II and III were substantially the same except in the drop out. The reason for the superiority in drop-out in Example I is considered to lie in the effect of the non-woven cloth which works to clean the surface of the tape to which the particles of the magnetic material stick.

EXAMPLE IV

An elastic flexible belt having a width of 20mm, a thickness of 150 microns and length of 315mm was provided in a video tape cassette containing a magnetic tape having a length of 185m in accordance with the third embodiment of the invention as shown in FIG. 3. The tension of the belt was set to be 15g. The video tape recorder used was model CR-6000 made by Victor Co., Ltd., Japan. The results measured were as shown in Table III.

TABLE III

| Measured Item | Example IV | Conventional Type |
| --- | --- | --- |
| Gitter | 1 μsec | 2–3 μsec |
| Drop-out after 50 times play | 15 | 24 |
| Durability | over 100 times | 80 times |
| State of Convolution | 72% | 65% |

We claim:

1. A magnetic tape magazine comprising a casing, a take-up core, a feed-out core and a magnetic tape wound in convolutions on said take-up core and a feed-out core wherein the improvement comprising a flexible belt having first and second ends and being tensioned around and contacting the tape convolutions wound on said cores for exerting a pressure on the tape convolutions and mounting means for attaching said first and second ends to said casing.

2. A magnetic tape magazine according to claim 1 wherein said flexible belt is an elastic belt tensioned by its elasticity.

3. A magnetic tape magazine according to claim 2 wherein said elastic belt is made of non-woven cloth.

4. A magnetic tape magazine according to claim 1 wherein said means for attaching includes at least one tension spring connected to said flexible belt to tension the same.

5. A magnetic tape magazine according to claim 1 wherein said means for attaching includes at least one rubber member connected to said flexible belt to tension the same.

6. A magnetic tape magazine according to claim 1 where said mounting means comprises a pair of pins fixed to said casing of the magazine which are respectively fixedly connected to said first and second ends.

* * * * *